Figure 1:
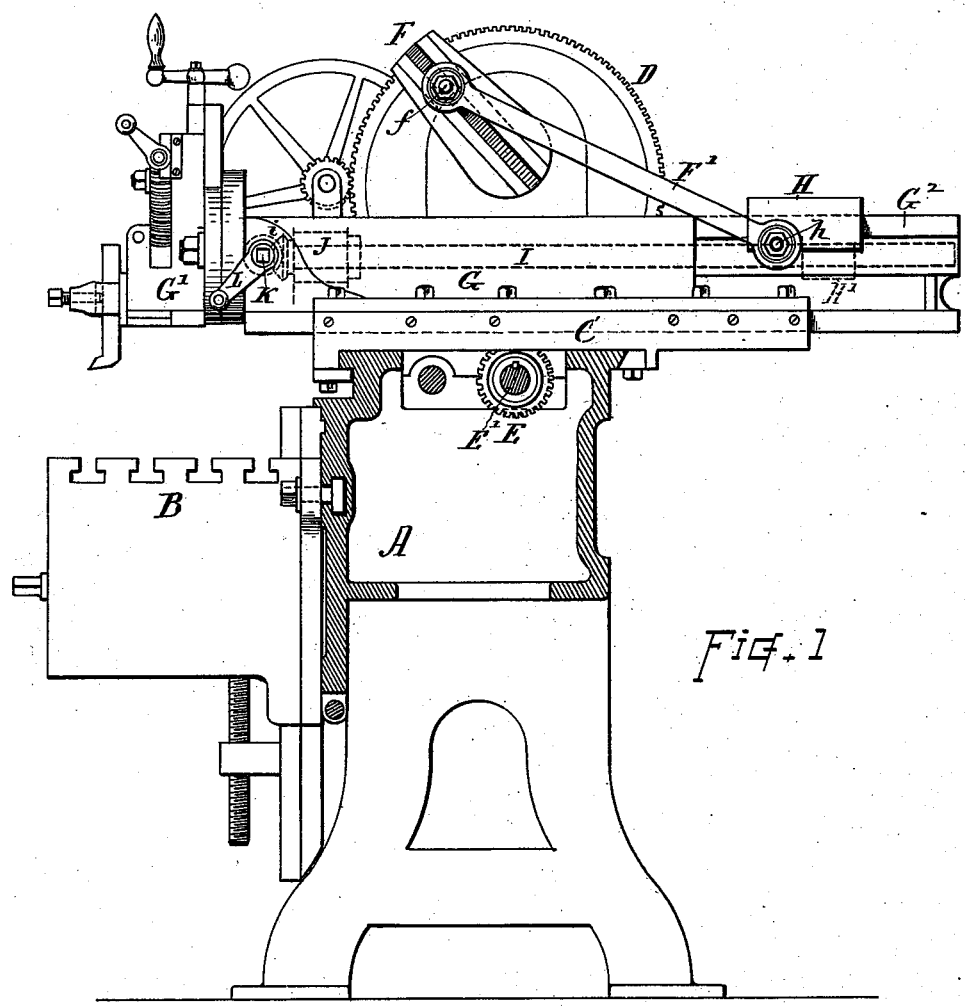

(No Model.)  2 Sheets—Sheet 1.
W. H. WARREN.
SHAPING MACHINE.

No. 377,969. Patented Feb. 14, 1888.

Witnesses—
D. R. Barton.
Simeon E. King.

Inventor—
William H. Warren.
By Chas. H. Burleigh,
Attorney.

(No Model.)  2 Sheets—Sheet 2.

W. H. WARREN.
SHAPING MACHINE.

No. 377,969.  Patented Feb. 14, 1888.

Witnesses—  
J. K. Barton.  
Simeon E. King.

Inventor—  
William H. Warren.  
By Chas. H. Burleigh,  
Attorney.

UNITED STATES PATENT OFFICE.

WILLIAM H. WARREN, OF WORCESTER, MASSACHUSETTS.

SHAPING-MACHINE.

SPECIFICATION forming part of Letters Patent No. 377,969, dated February 14, 1888.

Application filed October 1, 1887. Serial No. 251,211. (No model.)

*To all whom it may concern:*

Be it known that I, WILLIAM H. WARREN, a citizen of the United States, residing at Worcester, in the county of Worcester and State of Massachusetts, have invented certain new and useful Improvements in Shaping-Machines, of which the following, together with the accompanying drawings, is a specification sufficiently full, clear, and exact to enable persons skilled in the art to which this invention appertains to make and use the same.

The object of my present invention is to provide, in connection with the reciprocating tool-carrying mechanism in a shaping-machine, a convenient and efficient means for changing the relation or position of the tool-carrying head with regard to its operating connection and the work-supporting table while the machine is in operation or when at rest, as hereinafter more fully explained. Also, to provide, in combination with the reciprocating tool-carrying mechanism, an adjustable connection and a screw-shaft, or means for controlling the same, as desired. These objects I attain by mechanism, the nature of which is illustrated in the drawings and explained in the following description, the particular subject-matter claimed being hereinafter definitely specified.

Figure 3:
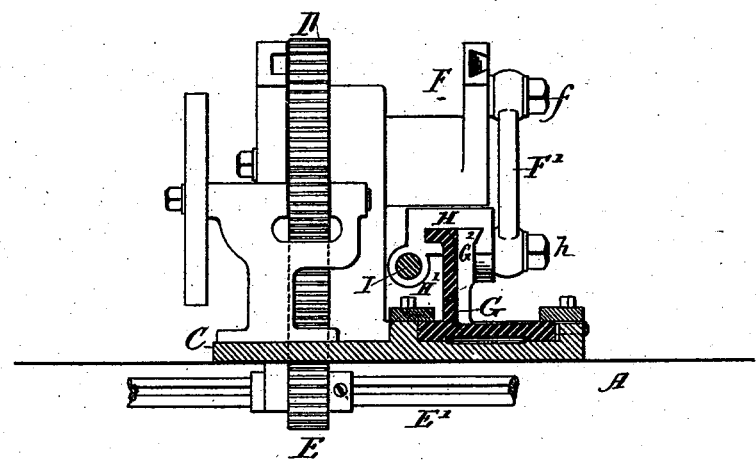
Figure 2:
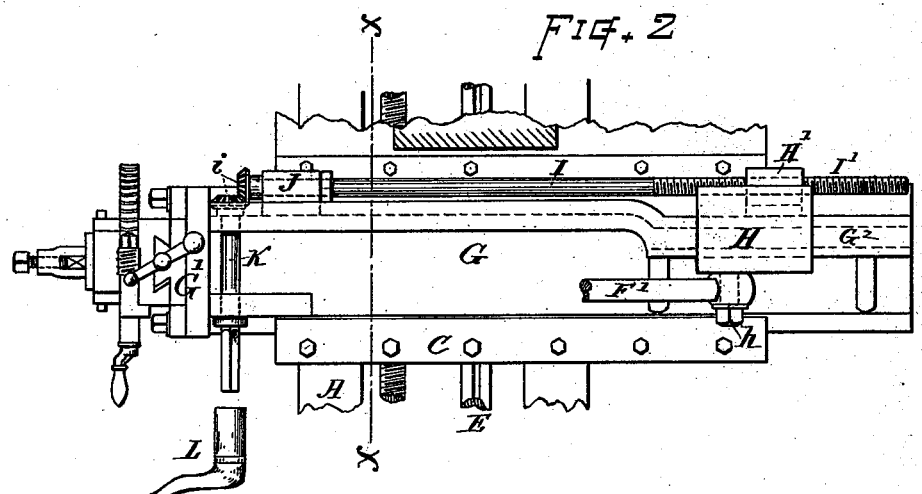

In the drawings, Figure 1 is a vertical sectional view of a shaping-machine illustrating my invention. Fig. 2 is a plan view of the reciprocating tool-carrying head and its slide-bar. Fig. 3 is a transverse section of the reciprocating slide-bar of the tool-carrying head and adjacent parts at line $x\ x$, Fig. 2.

In referring to parts, A denotes the main frame; B, the work-supporting table; C, the saddle-slide; D, the operating-gear; E, the pinion on the driving-shaft E', which actuates said gear; F, the operating-crank, and F' the connecting-rod by means of which the slide-bar G, with its tool-carrying head G', is reciprocated from the operating-crank.

All of the above-named parts may be constructed and arranged for operation in the usual well-known manner. The devices for adjusting the tool on the head G' to different angles and at different elevations may also be of the ordinary or any suitable construction.

The bar G, to which the tool-carrying head G' is attached, is mounted to slide back and forth in the guideways on the saddle-slide C, said tool-carrying head being connected in the usual manner to a circular disk on the front end of said slide-bar.

In accordance with my improvement the reciprocating slide-bar G is provided with an adjustable connection-block, H, to which the pivot-stud $h$ of the connecting-rod F' is fixed. Said block H is adjustably mounted upon a guideway, $G^2$, formed on the reciprocating bar, and thus connected with the tool-carrying head G'. Said connection-block is provided or made with a nut or screw-threaded bearing, H', through which is arranged the screw-threaded end I' of a shaft, I, which extends parallel with the slide, and the opposite end of which is supported and turns in a bearing, J, fixed to the side of the slide-bar G, near its front end, substantially in the manner illustrated. A shaft, K, is arranged transversely through the bearings on the head, preferably just in rear of the head-adjusting disk. Said shaft K is connected with the screw-shaft I by beveled gears $i$, and a removable crank or handle, L, is fitted to the projecting end of said shaft K, whereby the said shaft and screw I can be turned for changing the position of the connection-block H in relation to the bar G and head G' by sliding said block along the guideway $G^2$ backward or forward, which can be done while the machine is in motion or while at rest, and to any desired extent, thus causing the tool to work at a more forward or backward position in relation to the work-supporting table.

In place of the gears $i$, which in the present instance are shown as miter-gears, any proportioned beveled gears may be employed, or a worm or worm-wheel may be used, or other suitable connecting-gearing, whereby the shaft I is rotated from the shaft K, may be employed as an equivalent for said miter-gear.

The advantages incident to my invention are that the position of the tool can be shifted from one part of the work to another in a quick, accurate, and convenient manner, thus greatly facilitating the performance of certain classes of work. Also, the tool can be made to plane to or from a diagonal alignment by simply turning the crank L slightly at each reciprocation or forward stroke of the slide-bar and tool-carrying head. The crank-shaft K and screw I are also of great convenience and advantage when setting the wrist-pin $f$ of the main crank for varying the length of stroke, as it is simply necessary to turn the main crank-arm in a horizontal position. Then after loosening the nut of the wrist-pin $f$ said wrist-pin can be moved back or forth in the groove of the crank-arm by turning the crank L, thus shifting the position of the block H, by means of the shaft K and screw I, so as to bring the wrist-pin $f$ to the desired position, where it is secured by again tightening its nut.

In some instances, if preferred, a hand-wheel may be employed in place of the crank L for rotating the shaft K. The end of shaft K is preferably squared, and the crank L is made with a socket to slip onto and off from the end of said shaft.

What I claim as of my invention, and desire to secure by Letters Patent, is—

1. In a shaping-machine, in combination with the reciprocating slide-bar carrying the tool-supporting head and the operating-crank and connecting-rod by which movement is imparted to said head, the connecting-rod pivot adjustable in its connection with said slide-bar, and an adjusting shaft and handle engaging therewith for effecting adjustment, whereby the position of the tool-carrying head can be varied in relation to the operating-connections while the machine is in motion, substantially as and for the purpose set forth.

2. The combination, substantially as described, with the tool-carrying head G', having the reciprocating slide-bar G, provided with a guideway, $G^2$, of the adjustable connection-block H, carrying the connecting-rod pivot mounted on said guideway, a screw-shaft, I, engaging a threaded part attached to said connection-block, the transverse shaft K, connecting-gearing $i$, and hand-crank L, for the purposes set forth.

3. In a shaping-machine, the combination, substantially as described, of the main operating-crank F, carrying the adjustable wrist-pin $f$, the connecting-rod F', the slide-bar G, carrying the tool supporting head G', and provided with a guideway, $G^2$, the connection-block H, carrying the connecting-rod pivot $h$, adjustable on said guideway, the shaft I, confined in bearing J on said slide-bar and screw-threaded to said connection-block, the transverse shaft K, the gears $i$, and hand-crank L, for the purposes set forth.

Witness my hand this 26th day of September, A. D. 1887.

WILLIAM H. WARREN.

Witnesses:
CHAS. H. BURLEIGH,
ELLA P. BLENUS.